Patented Oct. 9, 1945

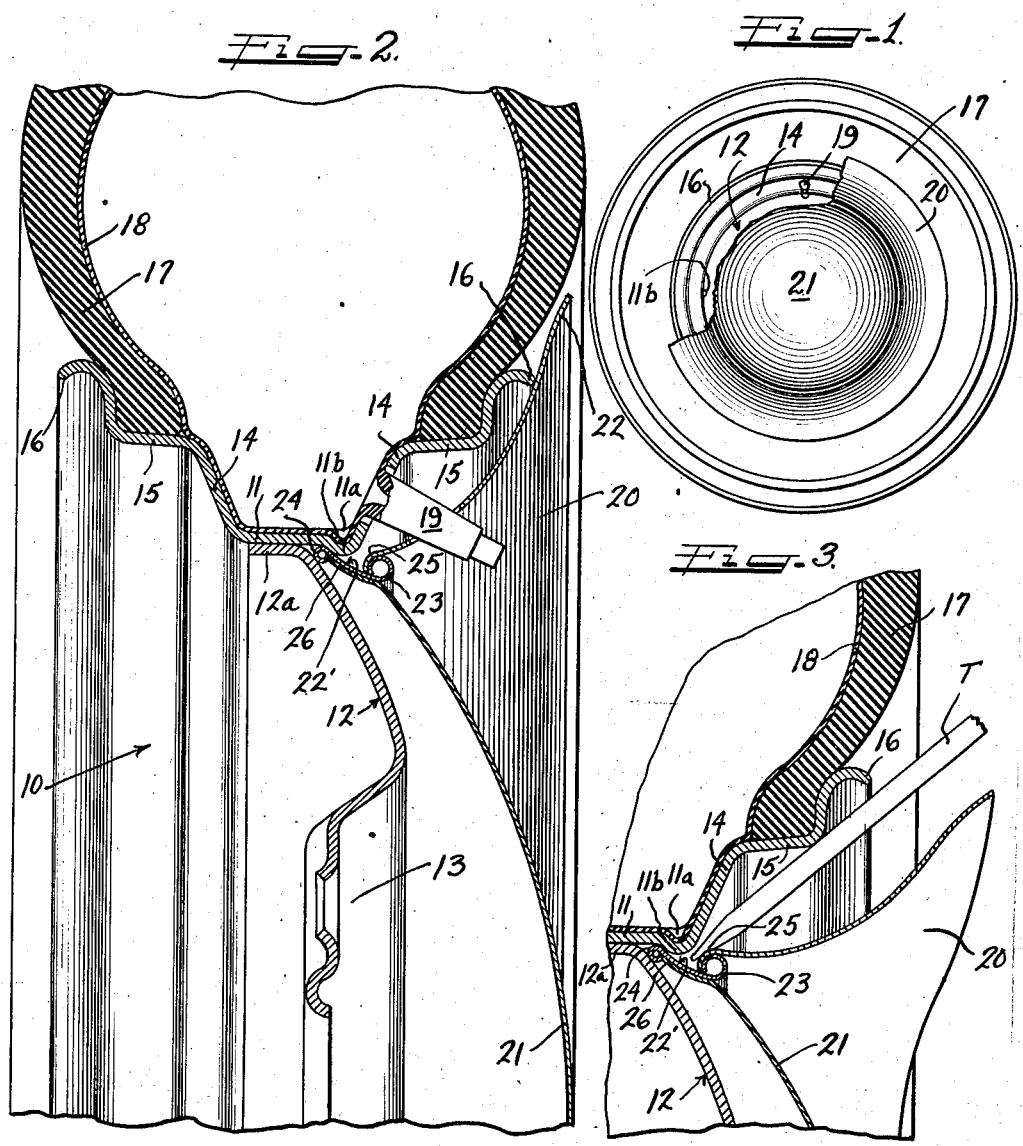

2,386,238

UNITED STATES PATENT OFFICE 2,386,238

WHEEL STRUCTURE

George Albert Lyon, Allenhurst, N. J.

Application July 31, 1943, Serial No. 496,888

6 Claims. (Cl. 301—37)

This invention is directed to an improved wheel structure and relates more particularly to an improved cover assembly therefor.

It is an important object of the invention to provide improved retaining means for maintaining a multi-part cover assembly over the outer side of a wheel structure.

Still another object of the invention is to provide an improved retaining assembly for maintaining an ornamental cover over the outer side of a wheel structure, said retaining member also serving to maintain the parts of a multi-part cover assembly in association with one another as a single unit.

Still another object of the invention is to provide for a wheel structure an improved cover assembly including a novel retaining means adapted to facilitate the removal thereof from the wheel structure by virtue of a pry-off operation.

Still another object of the invention is to provide for a wheel structure an improved cover assembly including retaining means for maintaining a multi-part cover assembly as a unitary structure and also serving to seal the outer side of the wheel against the passage of dirt to the rear of the cover and through openings in the wheel structure if such openings are incorporated therein.

It is still a further object of the invention to provide for a wheel structure an improved cover assembly having novel retaining means which serve to maintain the cover assembly over the outer side of the wheel structure, to maintain the several parts of a multi-part cover in assembled relationship as a unitary structure and further to effectively rigidify the cover assembly to strengthen the same, particularly in the vicinity of the portion thereof which is utilized for retention on the wheel structure.

It is a still further object of the invention to provide for a wheel structure, a cover assembly having an outer annular portion arranged for disposition over the radially outer part of the wheel structure, said cover portion being formed preferably from a synthetic plastic sheet material and having physical characteristics enabling it to be self-sustaining as to form and yet resiliently, locally deflectable temporarily out of its initial position, said cover part being arranged to snap back to its initial position when the flexing pressures are released therefrom.

Still another object of the invention is to provide for a wheel structure having a tire rim and a central load bearing portion, a multi-part cover assembly having an outer annular part formed of a cross-sectional configuration of such shape and magnitude that it extends radially outwardly beyond the edge portion of the tire rim to seal the junction between the edge portion and the tire therein and to simulate the curvature of the side wall of a tire in the rim, thereby to constitute, in effect, a continuation thereof and to give the appearance of being a part thereof and further to give the appearance of being a white side wall of a massive tire mounted on a wheel structure of minimum dimensions when colored white.

In accordance within the general features of the invention there is provided herein a wheel structure having a drop center type tire rim and a central load bearing portion, a plurality of indentations being formed on the axially outer part of the base flange of the tire rim, said indentations appearing at the radially outer surface of the base flange as indentations into which adjacent parts of the inner tube may be forced when inflated to prevent creepage thereof relative to the wheel and appearing as cover retaining protuberances spaced circularly around the radially inner surface thereof and a multi-part cover assembly including an outer annular part formed from synthetic plastic material and a central hub cap simulating part, there being a retaining annulus for securing said parts together and maintaining the assembled cover parts on the wheel structure, said retaining annulus including a generally axially extending body part having the axially inner part thereof extending axially inwardly and terminating in a reinforcing, retaining means and having the outer margin thereof formed to provide a radially outwardly extending bead, said last named bead being arranged to receive the radially inner part of an annular cover member to retain the same thereon and said inner part being arranged to receive at the inner surface thereof, a substantially axially inwardly extending skirt formed at the outer periphery of the central hub cap member, said retaining member being adapted to be engaged on the wheel by resilient retaining engagement of the axially inner part therebehind said protuberances on the tire rim.

Other objects and advantages of the invention will become apparent from the following description and accompanying drawing in which:

Figure 1 is a side elevational view with parts broken away of a wheel structure embodying my invention;

Figure 2 is a fragmentary radial cross-sectional view of the construction shown in Figure 1; and Figure 3 is a fragmentary radial cross-sectional view of the construction shown in Figure 2 with a portion of the cover member deflected to receive a pry-off tool for removal of the cover assembly from the wheel structure.

It will be understood that the embodiment shown herein is for illustrative purposes only and may be changed or modified without departing from the spirit and scope of the invention as set forth in the appended claims.

As shown best in Figure 2, the wheel structure shown herein includes a tire rim 10 having a base flange 11 which is secured to a flange 12a of a central load bearing portion 12 by means of riveting or welding or the like. The central load bearing portion 12 is further provided at its radially inner portion with a bolt-on flange 13 by means of which the wheel structure may be suitably secured to an appurtenance of the vehicle to which the wheel is attached, such as the brake drum or the like.

The tire rim 10 is further provided with opposite side wall flanges 14, opposite intermediate flanges 15 and opposite edge portions 16 between which are disposed the radially inner parts of a tire 17 having an inner tube 18 provided with a valve stem 19. The valve stem 19 protrudes through a suitable aperture with which it is aligned, in the adjacent side wall flange 14.

The cover assembly disclosed herein includes an outer annular part 20 and a central circular hub cap simulating part 21.

The annular portion 20 is preferably formed from sheet synthetic plastic material enabling it to be self-sustaining as to form and yet resiliently, locally flexible without permanent distortion and is provided with a cross-sectional configuration of such shape and magnitude that it simulates the adjacent side wall of the tire 17 to give the appearance of being a continuation thereof and extends radially outwardly as at 22 beyond the edge portion 16 to overlap the side wall of the tire and thus to conceal the junction between the tire and the edge portion 16 of the tire rim.

To the end that the cover 20 may be retainingly yet detachably secured to the wheel structure, the base flange 11 of the tire rim 10 is provided at the axially outer edge thereof with circularly spaced indentations 11a which are formed by a stamping process or the like to provide circularly spaced protuberances 11b on the radially inner surface thereof.

Since the indentations 11a are formed in the radially outer face of the base flange 11 it will be seen that the inner tube 18 will overlie the same and be forced thereinto when the tire is inflated. With this construction it is found that creepage of the inner tube relative to the tire rim, particularly when the tube is inflated only to a relatively low pressure, is obviated. Thus the valve stem 19 is protected against becoming torn from the tube due to movement thereof relative to the aperture through which it extends.

The retaining means for the cover assembly includes a retaining annulus 22' having a radially outwardly rolled beaded edge 23 at the axially outer margin thereof and a rolled bead 24 at the axially inner margin thereof, there being an intermediate annular body portion between the beads 23 and 24 which preferably is obliquely disposed and extends radially outwardly, axially inwardly as shown in Figure 2.

It will be seen that the radially inner edge of the cover member 20 prescribes a circle which is smaller than that prescribed by the radially outer extremity of the bead 23 and accordingly the cover member 20 and the retaining member 22' may be secured together as a unitary structure by the disposition of the radially inner margin 25 of the cover member 20 behind the bead 23, this portion 25 of the cover preferably conforming to the configuration of that part of the bead which it engages.

The central hub cap simulating cover portion 21 may likewise be secured to the retaining member 22' to provide a unitary assembly therewith by the provision of a peripheral skirt or flange 26 at the radially outer part thereof. This flange is arranged to be disposed in surface engagement with the radially inner surface of the intermediate part of the retaining member 22' so that the edge thereof is disposed in the nip formed between the bead 24 and said intermediate part of the retaining member. It will be understood that preferably the retaining member 22' and the cover portion may be assembled together prior to the association of the resulting unitary assembly with the wheel structure.

To the end that the aforementioned unitary cover assembly may be mounted upon the wheel structure, the axially inner portion of the retaining member 22' and particularly the bead 24 thereof is constructed to prescribe a circle having a larger diameter than that prescribed by the radially inner extremities of the protuberances 11b. Thus the retaining member 22', together with the associated cover members 20 and 21, may be securely applied to the wheel structure by axial inward movement thereof whereupon the bead 24 is forced out of round by the peaks of the protuberances 11b, thereafter the bead resiliently assuming its circular condition behind the protuberances 11b whereby it is maintained upon the wheel against accidental, axially outward movement and is also retained in such a position that it is urged against the adjacent portion of the outer surface of the central load bearing portion 12.

With the foregoing construction it will be seen that there is provided an extremely simple, cheaply produced multi-part cover assembly which may be maintained upon the wheel structure in concentric relationship over the outer surface thereof without the necessity of auxiliary retaining clips or the like, the rigidifying retaining member 22', which is utilized to hold the various parts of the cover together, also being the instrumentality for securing the cover on the wheel.

Additionally it will be seen that the bead 23 is exposed axially outwardly and thus, when the retaining member 22' is constructed from a metal or any other material which will take an ornamental finish or a high luster, the appearance of the cover assembly as a whole is considerably enhanced.

In assembling the parts of the cover with the retaining member 22' the bead 23 may, if desired, be rolled after the cover member 20 is urged axially inwardly thereof, thus a secure attachment is obtained between the parts.

Another attribute of the above described structure is the facility with which it lends itself to a pry-off operation for removal of the same from the wheel. As shown in Figure 3, it will be seen that the cover member 20 may be resiliently, locally flexed axially outwardly at the radially outer margin thereof to afford the insertion of a pry-off tool T so that the point thereof may be inserted on the axially inner side of the bead 23 and the adjacent portion 25 of the cover member 20. If then the handle of the tool is raised as shown in Figure 3 with the junction between the flange 15 and edge portion 16 of tire rim as a fulcrum, the point of the tool will move axially outwardly to withdraw the bead 24 from behind the respective protuberances 11b with the result that the cover may be disengaged from the wheel as a single unitary structure.

Another advantage of the structure arises from the association of the radially inner margin 25 of the cover member 20 with the axially outer portion of the retaining member 22'. With such an arrangement it will be seen that it is not necessary that the cover member 20 curve axially inwardly with as sharp a curvature as would be the case were it secured to the axially inner portion of the retaining member. Thus the simulation of the side wall of the tire by the cover member 20 is greatly augmented.

What I claim is:

1. In a cover assembly for disposition over the outer side of a wheel structure, an outer annular cover member, a central circular hub cap simulating cover member and an intermediate, rigidifying, retaining annulus, said annulus including a generally axially disposed intermediate body portion having the outer peripheral edge thereof bent radially outwardly from said intermediate body portion and having the inner margin thereof bent radially inwardly of said body portion, said outwardly bent portion receiving, at the axially inner side thereof, the radially inner portion of the annular cover member and said intermediate body portion receiving and supporting the radially outer margin of the central circular hub cap simulating cover, said bent portion at the inner margin of said retaining member retainingly receiving the edge of the central circular hub cap simulating cover and being adapted to retainingly engage with a part of a wheel structure over which the cover assembly is disposed.

2. In a cover assembly for a wheel structure, said cover assembly including an outer annular trim member and a central circular hub cap simulating member, retaining means for securing said members together as a unitary structure including a retaining annulus having an intermediate body portion for receiving and supporting a radially outer flange on said central cover member, having the outer margin thereof formed into a radially outwardly extending bead and having the inner margin thereof formed into a radially inwardly extending bead, said radially outwardly extending bead being adapted to receive at the inner surface thereof the radially inner margin of said annular trim member and said radially inwardly extending bead being adapted to retainingly receive the edge of said central cover member and being further adapted for retaining engagement with a part of the wheel structure over which the cover assembly is disposed.

3. In a cover assembly for disposition over the outer side of a wheel structure, an outer annular trim member formed from synthetic plastic sheet material and having physical characteristics enabling it to be form retaining and self-supporting and yet resiliently deformable so that it snaps back to the original shape thereof upon release of the deforming pressure, a central hub cap simulating cover member formed from synthetic plastic sheet material and a retaining annulus formed from sheet metal, said annulus having a generally axially extending body portion, means at the axially outer part thereof for retainingly receiving the inner part of the circular cover member and means at the axially inner part thereof for receiving the radially outer part of the central cover member.

4. In a cover assembly for disposition over the outer side of a wheel structure, a radially outer annular trim member formed from sheet synthetic plastic material and having physical characteristics enabling it to be self-supporting and form retaining and yet resiliently deflectible temporarily from its initial position and a central hub cap simulating circular member formed from sheet synthetic plastic material, retaining means including an annular retaining member formed from sheet metal, said retaining means including a generally axially extending intermediate body portion arranged to receive the radially outer margin of said hub cap cover member and having the axially inner margin thereof deformed out of the plane of the intermediate portion, said axially inner portion of the retaining member retainingly engaging with the wheel structure and retainingly receiving the radially outer edge of said hub cap member and having the axially outer margin thereof deformed radially outwardly from the plane of the intermediate body portion, said last named portion retainingly receiving the radially inner margin of the annular cover member on the axially inner part thereof and to be axially outwardly exposed between the cover members.

5. In a wheel structure including a tire rim and a central load bearing portion, said tire rim being of the drop center type and having a base flange provided with protuberance means extending generally radially inwardly, a cover assembly including a radially outer annular trim member and a central circular hub cap simulating member, retaining means for maintaining said cover members together as a unitary structure, including an annulus having an intermediate body portion for receiving and supporting the radially outer margin of said hub cap cover member and having a peripheral marginal part extending radially outwardly for retainingly receiving the radially inner edge portion of said annular trim member and having the opposed marginal portion thereof formed to provide a resilient retaining element adapted for resilient, detachable retained engagement on the axially inner side of said protuberance means formed in the tire rim.

6. In a wheel structure having a tire rim and a central load bearing portion, a cover assembly including a radially outer annular rim cover and a central circular hub cap simulating cover, retaining means for securing said cover members together including a relatively rigid annulus having an intermediate body portion disposed generally axially, having the radially outer edge thereof formed to retainingly receive the inner margin of the annular cover member on the axially inner side thereof and having the axially inner portion thereof formed to retainingly receive the peripheral edge of said hub cap cover member, said last named member having a peripheral skirt for supportingly engaging with the intermediate part of the retaining member and means on the wheel structure for retainingly engaging the axially inner portion of said retaining member.

GEORGE ALBERT LYON.